(12) United States Patent
Seo (10) Patent No.: US 8,605,958 B2
(45) Date of Patent: **\*Dec. 10, 2013**

(54) METHOD AND APPARATUS FOR GENERATING META DATA OF CONTENT

(75) Inventor: Joon-kyu Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

This patent is subject to a terminal disclaimer.

(21) Appl. No.: 13/108,357

(22) Filed: May 16, 2011

(65) Prior Publication Data

US 2011/0219042 A1  Sep. 8, 2011

Related U.S. Application Data

(63) Continuation of application No. 11/730,227, filed on Mar. 30, 2007, now Pat. No. 7,953,254.

(30) Foreign Application Priority Data

Oct. 27, 2006  (KR) .................. 10-2006-0105270

(51) Int. Cl.
  *G06K 9/00* (2006.01)
(52) U.S. Cl.
  USPC .......................................... 382/118; 715/234
(58) Field of Classification Search
  USPC .......................................... 382/118; 715/234
  See application file for complete search history.

(56) References Cited

U.S. PATENT DOCUMENTS

| | | | |
|---|---|---|---|
| 5,267,154 A | 11/1993 | Takeuchi et al. | |
| 6,292,688 B1 | 9/2001 | Patton | |
| 6,931,147 B2 | 8/2005 | Colmenarez et al. | |
| 7,003,139 B2 | 2/2006 | Endrikhovski et al. | |
| 7,577,310 B2 | 8/2009 | Kinjo | |
| 7,606,397 B2 | 10/2009 | Kowald | |
| 7,714,878 B2 | 5/2010 | Gabay et al. | |
| 2002/0046139 A1 | 4/2002 | Ozaki et al. | |
| 2003/0108241 A1 | 6/2003 | Colmenarez et al. | |

(Continued)

FOREIGN PATENT DOCUMENTS

| | | |
|---|---|---|
| CN | 1552041 A | 12/2004 |
| JP | 2003-233816 A | 8/2003 |
| KR | 2003-0094163 A | 12/2003 |
| KR | 10-2005-0007688 A | 1/2005 |
| KR | 10-2007-0019311 A | 2/2007 |
| WO | 2005101413 A1 | 10/2005 |

OTHER PUBLICATIONS

Pantic et al., Automatic Analysis of Facial Expressions: The state of the art, IEEE Transactions on Pattern Analysis and Machine Intelligence, vol. 22, No. 12, Dec. 2000.*

(Continued)

*Primary Examiner* — John Strege
(74) *Attorney, Agent, or Firm* — Sughrue Mion, PLLC (57) ABSTRACT

A method and apparatus are provided for generating emotional information including a user's impressions in relation to multimedia content or meta data regarding the emotional information, and a computer readable recording medium storing the method. The meta data generating method includes receiving emotional information in relation to the content from at least one client system which receives and reproduces the content; generating meta data for an emotion using the emotional information; and coupling the meta data for the emotion to the content. Accordingly, it is possible to automatically acquire emotional information by using the facial expression of a user who is appreciating multimedia content, and use the emotional information as meta data.

11 Claims, 8 Drawing Sheets

(56) References Cited

U.S. PATENT DOCUMENTS

| | | |
|---|---|---|
| 2003/0118974 A1* | 6/2003 | Obrador .................. 434/236 |
| 2003/0133599 A1 | 7/2003 | Tian et al. |
| 2003/0156304 A1 | 8/2003 | Fedorovskaya et al. |
| 2004/0095344 A1 | 5/2004 | Dojyun et al. |
| 2004/0197013 A1 | 10/2004 | Kamei |
| 2005/0159958 A1 | 7/2005 | Yoshimura |
| 2005/0182791 A1 | 8/2005 | Lim et al. |
| 2006/0281064 A1 | 12/2006 | Sato et al. |
| 2007/0033050 A1* | 2/2007 | Asano et al. ............... 704/270 |
| 2007/0186243 A1* | 8/2007 | Pettit et al. ................ 725/46 |
| 2008/0101660 A1 | 5/2008 | Seo |
| 2010/0211966 A1 | 8/2010 | Zhang et al. |

OTHER PUBLICATIONS

B. Fasel, Juergen Luettin, "Automatic facial expression analysis: a survey", Pattern Recognition, vol. 36, Issue 1, Jan. 2003, pp. 259-275, ISSN 0031-3203.

Cowie, R., Douglas-Cowie, E., Tsapatsoulis, N., Votsis, G., Kollias, S., Fellenz, W., Taylor, J.G., "Emotion recognition in human-computer interaction", Signal Processing Magazine, IEEE, Jan. 2001, vol. 18, Issue 1, ISSN: 1053-5888.

Humaine Emotion Annotation and Representation Language (EARL): Proposal, Jun. 30, 2006, http://emotion-research.net/projects/humaine/earl/proposal.

Padgett, C., Cottrell, G., "Identifying Emotion in Static Face Images", Nov. 10, 1995, La Jolla, CA., University of California, San Diego.

De Silva, L.C., Miyasato, T., Nakatsu, R., "Facial emotion recognition using multi-modal information", Information, Communications and Signal Processing, 1997. ICICS., Proceedings of 1997 International Conference on, vol. 1, pp. 397-401.

Notice of Allowance issued Mar. 26, 2008 by the Korean Intellectual Property Office for Korean Application No. 10-2006-0105270.

\* cited by examiner

| TYPE OF EMOTION | STRENGTH (1: LOWEST) |
|---|---|
| NEUTRALITY | 1~5 |
| PLEASURE | 1~5 |
| SADNESS | 1~5 |
| ANGER | 1~5 |
| DISGUST | 1~5 |
| HAPPINESS | 1~5 |
| SURPRISE | 1~5 |
| ⋮ | ⋮ |

METHOD AND APPARATUS FOR GENERATING META DATA OF CONTENT

CROSS-REFERENCE TO RELATED PATENT APPLICATION

This is a continuation of application Ser. No. 11/730,227 filed Mar. 30, 2007 which claims priority from Korean Patent Application No. 10-2006-0105270, filed on Oct. 27, 2006, in the Korean Intellectual Property Office. The entire disclosure of the prior applications is considered part of the disclosure of the accompanying continuation application and are hereby incorporated by reference.

BACKGROUND OF THE INVENTION

1. Field of the Invention

Methods and apparatuses consistent with the present invention relate to meta data of content, and more particularly, to generating emotional information including a user's impressions in relation to multimedia content or meta data regarding the emotional information.

2. Description of the Related Art

On-line services which provide multimedia content have been become widely popular. However, feedback regarding a user's emotions, feelings, etc. after he or she appreciates content depends on the user's voluntary provision of information. Accordingly, it is difficult to acquire the user's emotional information after the user has appreciated the content. Although the user provides his or her emotional information, the accuracy or objectivity of the information cannot be ensured.

SUMMARY OF THE INVENTION

The present invention provides a method and apparatus for automatically acquiring a user's emotional information in relation to content which he or she is appreciating, and reflecting the emotional information in meta information of the content, and a computer-readable recording medium storing the method.

According to an aspect of the present invention, there is provided a method of generating meta data of content, including: receiving emotional information in relation to the content from at least one client system which receives and reproduces the content; generating meta data for an emotion using the emotional information; and coupling the meta data for the emotion to the content.

The generating the meta data for the emotion includes determining a representative type of emotion representing the content.

The generating the meta data for the emotion includes determining a representative type of emotion representing each scene of the content.

The generating the meta data for the emotion includes determining a representative type of emotion for each predetermined time period during reproduction of the content.

The coupling the meta data for the emotion to the content includes adding the meta data for the emotion to existing meta data of the content.

The adding the meta data for the emotion includes, if the content is a broadcast program, adding the meta data for the emotion to an electronic program guide (EPG) for the broadcast program.

The adding the meta data for the emotion includes adding the meta data for the emotion to header information of the content.

The method further includes, before providing the content to the at least one client system, adding information about a time required for acquiring a user image to the meta data of the content, to allow the at least one client system to acquire the emotional information.

According to another aspect of the present invention, there is provided a method of generating emotional information in relation to content, including: acquiring a user image while the content is reproduced; extracting facial information from the user image; generating the emotional information in relation to the content by comparing the facial information with facial expression template information; and transmitting the emotional information to a server which provides the content.

The acquiring the user image includes acquiring the user image whenever each scene of the content is reproduced.

The acquiring the user image includes receiving at least two user images from an image input unit while the content is reproduced.

The generating the emotional information includes generating representative emotional information representing emotional information generated from the at least two user images.

The acquiring the user image includes acquiring the user image at a time corresponding to an emotional information acquiring time included in the meta data of the content.

The generating the emotional information includes, if a plurality of pieces of the facial information are extracted from the user image, generating emotional information corresponding to each piece of the facial information.

The generating the emotional information includes generating emotional information including a type and strength of an emotion when the user image is acquired, with reference to the facial expression template information.

According to another aspect of the present invention, there is provided an apparatus for generating meta data of content, including: a communication unit which receives emotional information in relation to the content from at least one client system which receives and reproduces the content; and a meta data generating unit which generates meta data for an emotion using the emotional information, and couples the meta data for the emotion to the content.

According to another aspect of the present invention, there is provided an apparatus for generating emotional information in relation to content, including: an image input unit which acquires a user image while the content is reproduced; a facial image extraction unit which extracts facial information from the user image; an emotional information generating unit which compares the facial information with facial expression template information, and generates the emotional information in relation to the content based on a result of the comparison; and a communication unit which transmits the emotional information to a server which provides the content.

The response of audiences which watch contents, such as movies, music, or moving pictures, appears by their expressions while appreciating the contents. Particularly, whether a corresponding content producer stimulates a user's emotion according to his or her intention can be objectively recognized by analyzing the user's expressions. The present invention generates emotional information using the expression information of a user which uses content, and provides the emotional information to the corresponding content producer, thereby allowing the user's emotional information to be used as meta data of the corresponding content. Hereinafter, a case where content, such as movies or moving pictures, is reproduced is illustrated, however, the present invention is not limited to this. The present invention can be also applied to different types of contents.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described in detail by explaining exemplary embodiments of the invention with reference to the attached drawings.

Figure 1:
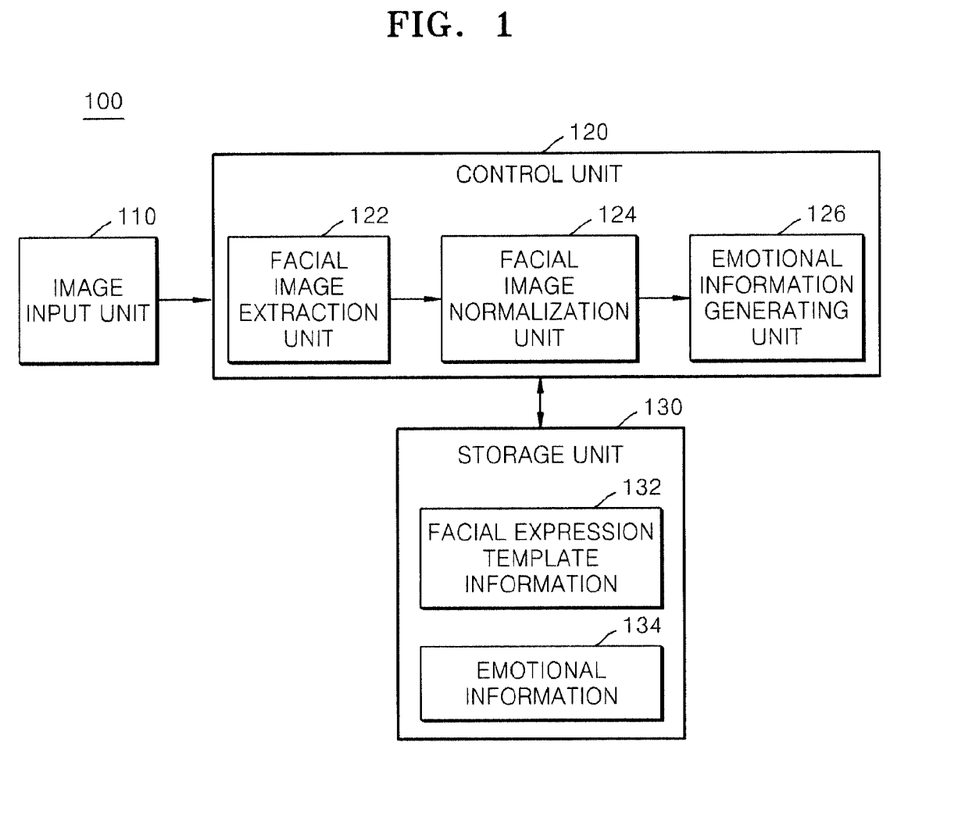
FIG. 1 is a block diagram of an emotional information generating apparatus according to an exemplary embodiment of the present invention.

FIG. 1 is a block diagram of an emotional information generating apparatus according to an exemplary embodiment of the present invention.

Referring to FIG. 1, the emotional information generating apparatus 100 includes an image input unit 110 for acquiring images of a user (users) photographed by a camera, etc., a storage unit 130 for storing facial expression template information 132, in which people's various facial expressions are created as templates, and user's emotional information 134, and a control unit 120 including a facial image extraction unit 122, a facial image normalization unit 124, and an emotional information generating unit 126, and controlling different components to generate the user's emotional information while content is being reproduced.

The image input unit 110 receives a user image obtained by using a camera, etc. to photograph a user appreciating content. The user image is acquired at a predetermined time. According to various methods, two or more user images may be acquired for each item of content, and the user images may be acquired periodically in a unit of a second, a minute, etc., or whenever a scene of the content changes. The predetermined time for acquiring the user image can be recognized, by interpreting time information pre-stored in the emotional information generating apparatus 100, time information received from a content provider, or emotional information acquirement time information included in meta data of the content.

The facial image extraction unit 122 extracts facial image information from the user image. In order to extract the facial image information from the user image, a Gabor filter response can be used. In the case where a plurality of facial images are extracted from a plurality of user images, emotional information corresponding to each facial image is generated. The facial image normalization unit 124 adjusts the extracted facial images according to the sizes of templates included in the facial expression template information 132.

The emotional information generating unit 126 determines the user's facial expression by template matching, and generates and outputs emotional information according to the user's facial expression. If a plurality of facial images are extracted from the user images, emotional information including the number of people and individual facial expression information is generated. If two or more user images are acquired and then two or more facial expression images for the same user are acquired, a plurality of emotional information is generated. In this case, representative emotional information of the plurality of emotional information may be generated. At this time, the type of emotion which the user most frequently has from among the plurality of emotional information can be determined as a representative type of emotion. However, the present invention is not limited to this, and various methods can be used according to applications. The emotional information is used as meta data of the corresponding content, and can be statistically processed or integrated by various methods. For example, data including a representative type of emotion for each scene of the content, or data including individual emotional information is output. Also, the emotional information can further include information regarding the strength of emotions as well as the types of emotions.

Figure 2:
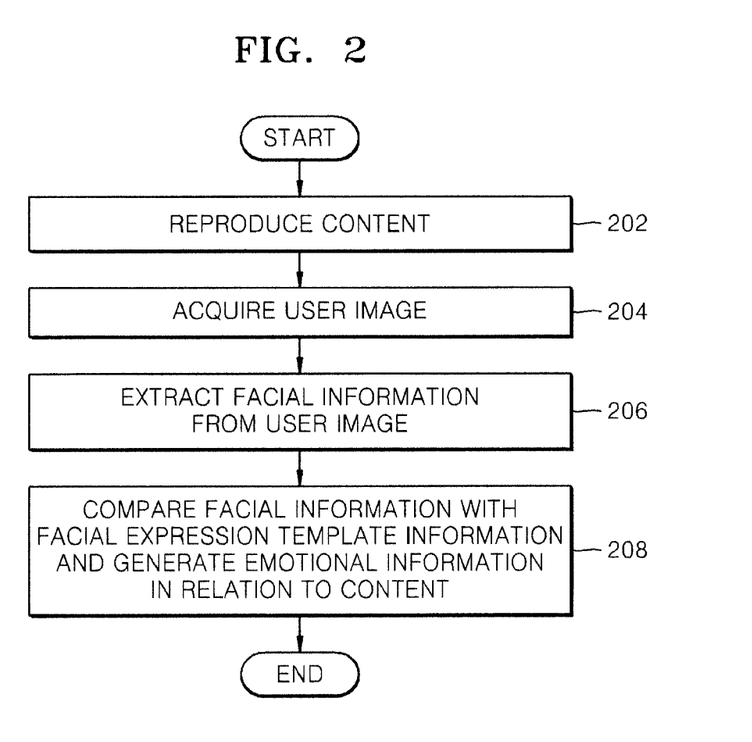
FIG. 2 is a flowchart of an emotional information generating method according to an exemplary embodiment of the present invention.

FIG. 2 is a flowchart of an emotional information generating method according to an exemplary embodiment of the present invention.

Referring to FIG. 2, first, content is reproduced (operation 202). While the content is reproduced, a user image is acquired at a predetermined time (operation 204). Then, only a facial image part is extracted from the acquired user image, so that facial information is generated (operation 206). The facial information is compared with facial expression template information stored in the storage unit 130 to obtain a matched facial expression, and then emotional information for the matched facial expression is generated (operation 208). The emotional information can be stored in the storage unit 130, transmitted to a content providing server, or additionally recorded in meta data of the content.

Figure 3:
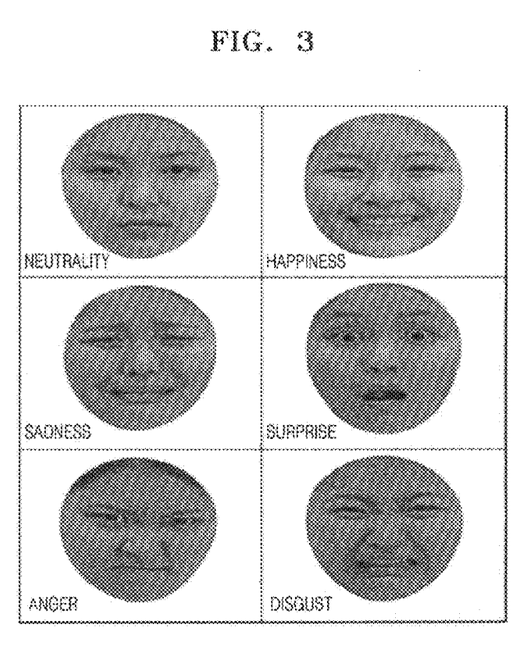
FIG. 3 is a view illustrating facial expression template information according to an exemplary embodiment of the present invention.

FIG. 3 is a view illustrating facial expression template information according to an exemplary embodiment of the present invention.

Referring to FIG. 3, a plurality of facial expression templates associated with facial expressions representing neutrality, happiness, etc. are stored in the storage unit 130. Each facial expression corresponds to a type of emotion. Facial expression templates representing different strength with respect to each type of emotion can be additionally stored. For example, a facial expression representing happiness can be divided into 5 levels according to its strength.

Figure 4:
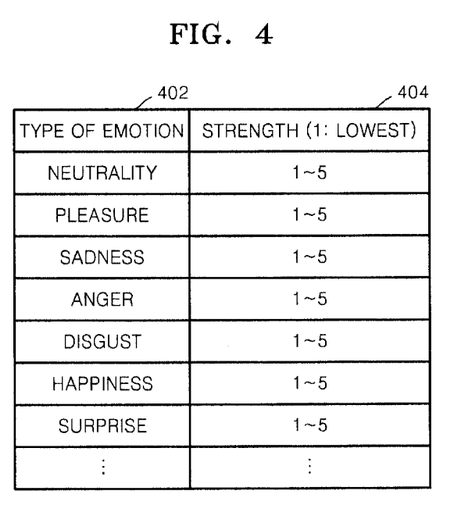
FIG. 4 is a table in which the types of emotional information are listed, according to an exemplary embodiment of the present invention.

FIG. 4 is a table in which the types of emotional information are listed, according to an exemplary embodiment of the present invention. Referring to FIG. 4, the types of emotions 402 and the strength of emotions 404 are illustrated.

Figure 5:
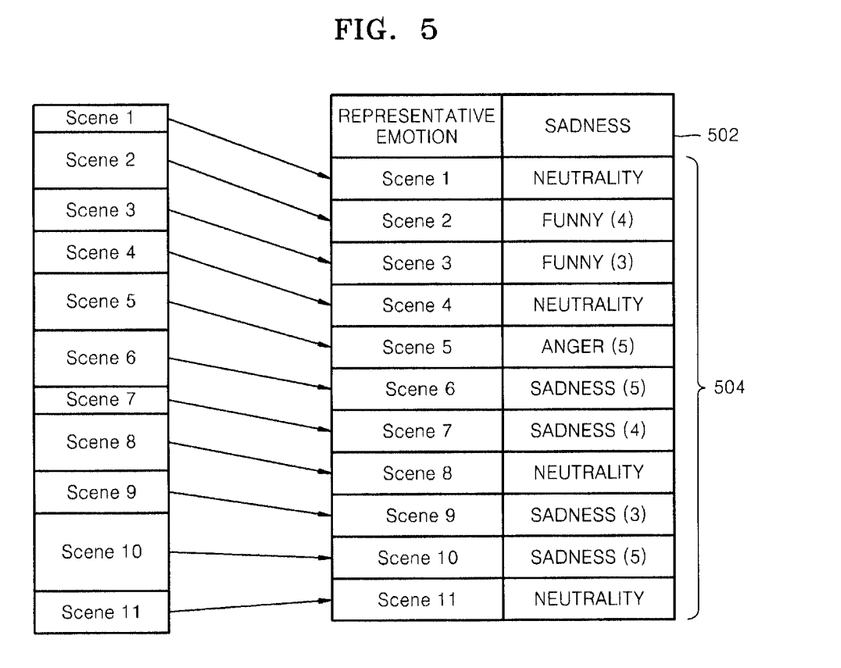
FIG. 5 is a view illustrating emotional information generated according to an exemplary embodiment of the present invention.

FIG. 5 is a view illustrating emotional information generated according to an exemplary embodiment of the present invention. Referring to FIG. 5, the emotional information includes types of emotional information 504 for respective scenes and a representative emotion 502 of the content. In this exemplary embodiment, "sadness," which is the representative emotion of the content, is a user's emotion in four scenes, and is the emotion portrayed by a facial expression which the user most frequently has while watching the content. The types of emotional information 504 for each scene may be a representative emotion of emotional information obtained by acquiring user images several times or periodically during each scene.

Figure 6:
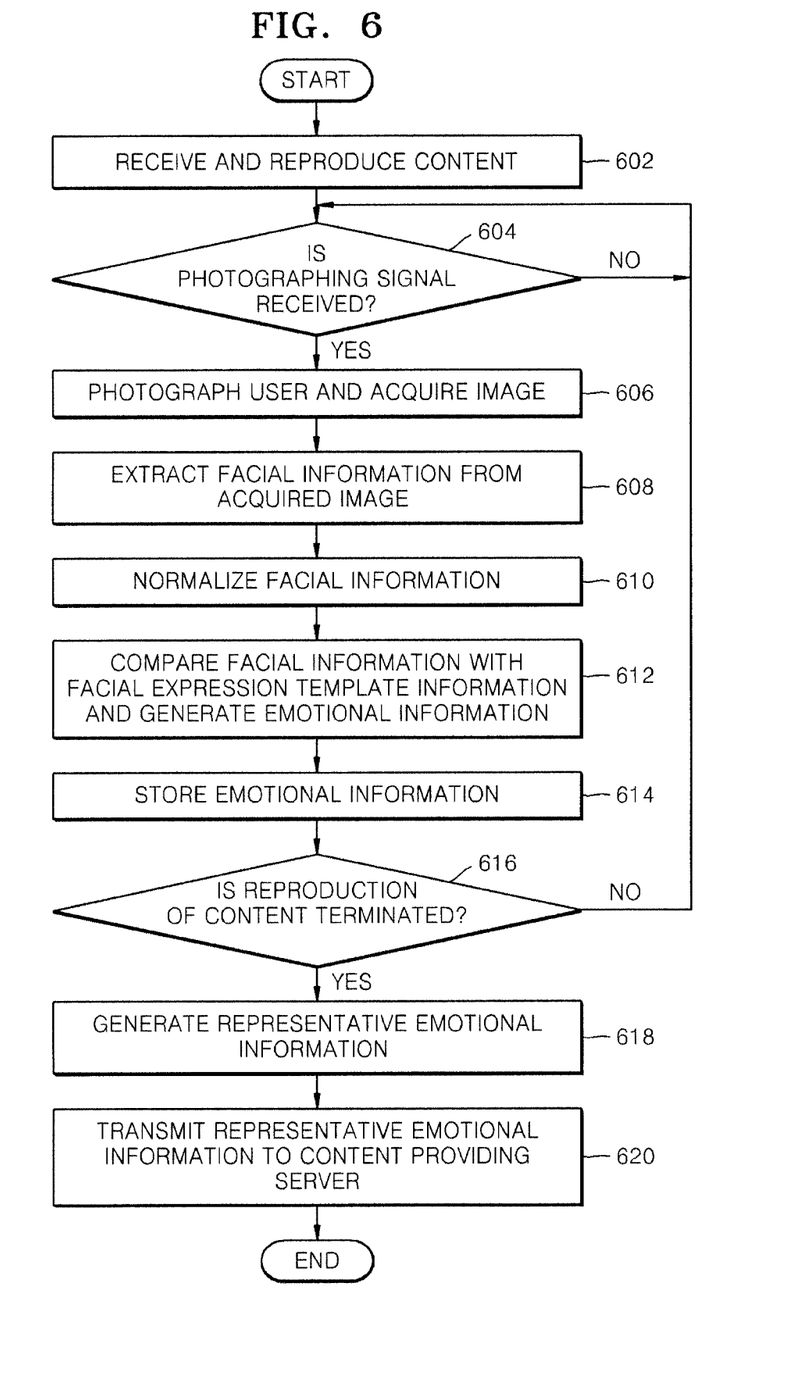
FIG. 6 is a flowchart of an emotional information generating method according to another exemplary embodiment of the present invention.

FIG. 6 is a flowchart of an emotional information generating method according to another exemplary embodiment of the present invention, wherein generated emotional information is fed back to a content provider and used as meta data by the content provider.

Referring to FIG. 6, content is received from a content providing server and is reproduced (operation 602). If a photographing signal is received (operation 604), a user image is acquired by photographing a user using a camera, etc. installed in the emotional information generating apparatus 100 illustrated in FIG. 1 (operation 606). The photographing signal is generated at a predetermined time. For example, the photographing signal is generated at a predetermined time designated in meta data of the content, in units of a predetermined period, or whenever a scene changes. By more frequently photographing the user, a user's emotion can be more exactly analyzed. Then, according to the facial expression recognition method, the facial expression of the user image is analyzed. In order to recognize the facial expression, first, a facial area is separated from the user image, and facial information is extracted from the facial area (operation 608). The extracted facial information is normalized (operation 610), and the normalized facial information is compared with facial expression template information, so that the facial expression is analyzed and emotional information corresponding to the facial expression is generated (operation 612). Then, the emotional information is stored (operation 614). The process from operation 604 to operation 614 is repeated, until reproduction of the content is terminated (operation 616).

After the reproduction of the content is terminated, representative emotional information, which represents the generated emotional information, is generated (operation 618), and is transmitted to the content providing server (operation 620). According to applications, all the generated emotional information and/or results obtained by statistically processing or integrating the generated emotional information, as well as the representative emotional information, can be provided to the content providing server.

Figure 7:
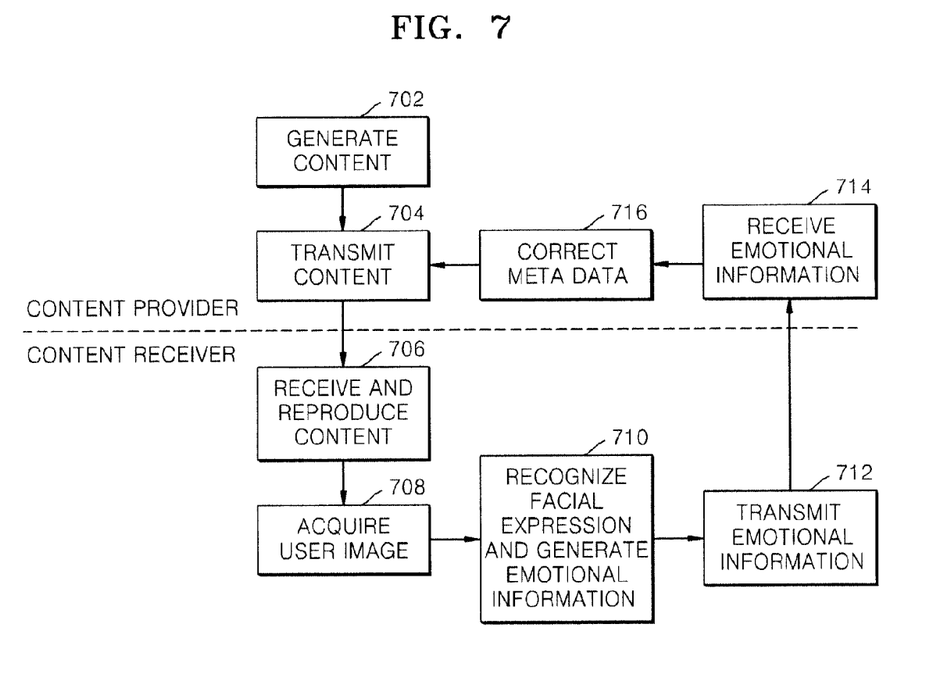
FIG. 7 is a view explaining a relationship between a content provider and a content receiver according to an exemplary embodiment of the present invention.

FIG. 7 is a view explaining a relationship between a content provider and a content receiver according to an exemplary embodiment of the present invention. In FIG. 7, the content receiver corresponds to the emotional information generating apparatus 100 illustrated in FIG. 1, and the content provider corresponds to a meta data generating apparatus comprising a communication unit which receives emotional information from the content receiver, and a meta data generating unit which generates meta data for an emotion using the received emotional information and couples the meta data to the content.

Referring to FIG. 7, the content provider generates content that is to be serviced (operation 702), and transmits the content to the content receiver (operation 704). The content receiver acquires a user image (operation 708) while receiving and reproducing the content (operation 706). The user's facial expression is recognized from the acquired user image, and emotional information corresponding to the recognized facial expression is generated (operation 710), and is transmitted to the content provider (operation 712). The content provider receives the emotional information from the content receiver (operation 714), and reflects the emotional information to the meta data of the content (operation 716). Then, a different content receiver which has received the corresponding content can recognize people's response to the content with reference to the meta data.

The present invention can be applied to various types of contents. In the case of broadcast contents, since meta data is included in program details of an EPG, users' emotions for the broadcast contents can be recognized with reference to the EPG information. In the case of music contents, it is possible to photograph a user at a predetermined time or in a predetermined period by using a camera installed in a meta data generating apparatus at a content receiver side which reproduced the music contents, recognize the user's facial expression, and generate emotional information corresponding to the user's facial expression. In the case of picture contents, it is possible to recognize a user's facial expression for each picture by using a camera installed in a meta data generating apparatus at a content receiver side which reproduces the picture contents. The present invention can also be applied to games, visual telephone services, etc.

Figure 8:
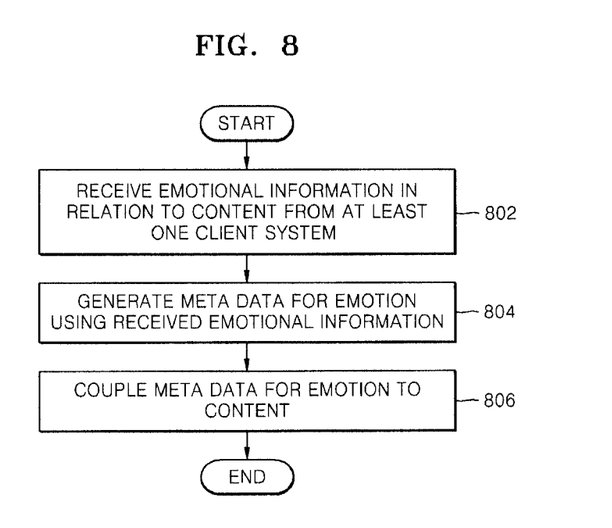
FIG. 8 is a flowchart illustrating a meta data generating method according to an exemplary embodiment of the present invention.

FIG. 8 is a flowchart illustrating a meta data generating method according to an exemplary embodiment of the present invention.

Referring to FIG. 8, a meta data generating apparatus first receives emotional information in relation to content from at least one client system (operation 802). The at least one client system generates the emotional information for the content, while receiving and reproducing the content from the meta data generating apparatus or a different content providing server. The meta data generating apparatus generates meta data for an emotion using the received emotional information (operation 804). At this time, the emotional information received from a plurality of client systems is integrated. Then, a representative type of emotion representing the content is determined, a representative type of emotion which represents each scene of the content is determined, or a representative type of emotion for each predetermined time period is determined, so that meta data for an emotion including the determined type of emotion can be generated. As an exemplary method of determining a representative type of emotion from among a plurality of types of emotion, as described above, a method of determining, as a representative type of emotion, a type of emotion which a user most frequently has can be used. The generated meta data for an emotion is coupled to the content (operation 806). In order to couple the meta data to the content, a method of adding the meta data to existing meta data of the content can be used. In the case when the content is a broadcast program, the meta data can be added to an EPG. In the case of content in which meta data is recorded in a form of a header, the meta data can be added to header information. Before providing the content to the at least one client system, the meta data generating apparatus can add information about a period or time when the client system obtains a user image to the meta data of the content, in order to acquire emotional information.

The meta data for the emotion coupled to the content can be applied to various fields, when the content is again used. The emotional information included in the meta data can be used for publicizing the content, and the meta data for the emotion can be provided to a user so that the user can select content. Also, only a part corresponding to a user's desired emotion is extracted from content so that he or she can watch only a desired part, or new content including only the extracted part can be generated.

The method according to the exemplary embodiments of the present invention as described above can also be embodied as computer readable codes on a computer readable recording medium.

As described above, according to the exemplary embodiments of the present invention, it is possible to automatically acquire emotional information by using a facial expression of a user who is appreciating multimedia content. Furthermore, it is possible to detect a change in a user's emotions according to respective scenes of image content, or acquire emotional information in relation to a specific part from which users' response can be analyzed.

By using the meta data generated according to the exemplary embodiments of the present invention, a content provider can objectively recognize users' response to content and reflect the recognized information in the manufacturing of subsequent content or in users' response analysis. Also, users' emotional information in relation to content can be applied to medical purposes.

Advertisers who advertise products by using content can easily become aware of advertising effects, and content users can easily search for desired content with reference to content meta data including different users' emotional information. For example, by using emotional information as a search keyword, users can search for movies which cause laughter in many people while they watch it, or search for and watch only a part of a movie, which causes laughter.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of providing content, the method comprising:
    receiving emotional information in relation to the content from a client that is generated by:
        providing the content to a user;
        acquiring multiple images of the user;
        extracting facial information from the user images; and
        generating the emotional information corresponding to the facial information;
    generating information about a representative type of emotion associated with the emotional information received from the client;
    updating an Electronic Program Guide associated with the content or a header of the content using the information about the representative type of emotion; and providing the content with the updated Electronic Program Guide or the updated header to the user so that the user can reproduce portions of the content based on the emotion.

2. The method of claim 1, further comprising:
    providing the content with the updated Electronic Program Guide or the updated header to a client system which requests the content.

3. A non-transitory computer readable recording medium storing a computer program for performing a method of providing content, the method comprising:
    receiving emotional information in relation to the content from a client that is generated by:
        providing the content to a user;
        acquiring multiple images of the user;
        extracting facial information from the user images; and
        generating the emotional information corresponding to the facial information;
    generating information about a representative type of emotion associated with the emotional information received from the client;
    updating an Electronic Program Guide associated with the content or a header of the content using the information about the representative type of emotion; and providing the content with the updated Electronic Program Guide or the updated header to the user so that the user can reproduce portions of the content based on the emotion.

4. An apparatus for providing content, the apparatus comprising:
    a communication unit which receives emotional information in relation to the content from a client that is generated by:
        providing the content to a user;
        acquiring multiple images of the user;
        extracting facial information from the user images; and
        generating the emotional information corresponding to the facial information; and
    a meta data correcting unit which reflects the emotional information to existing meta data of the content, by:
    generating information about a representative type of emotion associated with the emotional information received from the client, and
    updating an Electronic Program Guide associated with the content or a header of the content using the information about the representative type of emotion, wherein the content with the updated Electronic Program Guide or the updated header is provided to the user so that the user can reproduce portions of the content based on the emotion.

5. The apparatus of claim 4, wherein the communication unit transmits the content with the updated Electronic Program Guide or the updated header to a client system which requests the content.

6. The method of claim 1, wherein the updating comprises:
    adding the information about the representative type of emotion to existing emotional information in meta data of the content in the Electronic Program Guide or in the header.

7. The method of claim 1, wherein the receiving comprises receiving the emotional information from several client systems of different users, and
    the generating comprises integrating the emotional information received from the several client systems to determine the representative type of emotion.

8. A method of providing content, the method comprising:
    receiving emotional information in relation to the content from a client that is generated by:
        providing the content to a user;
        acquiring multiple images of the user;
        extracting facial information from the user images; and
        generating the emotional information corresponding to the facial information;
    generating information about a representative type of emotion associated with the emotional information received from the client;
    updating an Electronic Program Guide associated with the content using the information about the representative type of emotion; and providing the content with the updated Electronic Program Guide or the updated header to the user so that the user can reproduce portions of the content based on the emotion.

9. A method of providing content, the method comprising:
receiving emotional information in relation to the content from a client that is generated by:
provided the content to a user;
acquiring multiple images of the user;
extracting facial information from the user images; and
generating the emotional information corresponding to the facial information;
generating information about a representative type of emotion associated with the emotional information received from the client;
updating a header of the content using the information about the representative type of emotion; and providing the content with the updated Electronic Program Guide or the updated header to the user so that the user can reproduce portions of the content based on the emotion.

10. An apparatus for providing content, the apparatus comprising:
a communication unit which receives emotional information in relation to the content from a client that is generated by:
providing the content to a user;
acquiring multiple images of the user;
extracting facial information from the user images; and
generating the emotional information corresponding to the facial information; and
a meta data correcting unit which reflects the emotional information to existing meta data of the content, by:
generating information about a representative type of emotion associated with the emotional information received from the client; and
updating an Electronic Program Guide associated with the content using the information about the representative type of emotion, wherein the content with the updated Electronic Program Guide is provided to the user so that the user can reproduce portions of the content based on the emotion.

11. An apparatus for providing content, the apparatus comprising:
a communication unit which receives emotional information in relation to the content from a client that is generated by:
providing the content to a user;
acquiring multiple images of the user;
extracting facial information from the user images; and
generating the emotional information corresponding to the facial information; and
a meta data correcting unit which reflects the emotional information to existing meta data of the content, by:
generating information about a representative type of emotion associated with the emotional information received from the client; and
updating a header of the content using the information about the representative type of emotion, wherein the content with the updated header is provided to the user so that the user can reproduce portions of the content based on the emotion.

* * * * *